June 26, 1956
L. LAZARE
2,752,296
FRACTIONAL DISTILLATION OF DECOMPOSITION
PRODUCTS OF DIARYL ALKANES
Filed Aug. 26, 1954
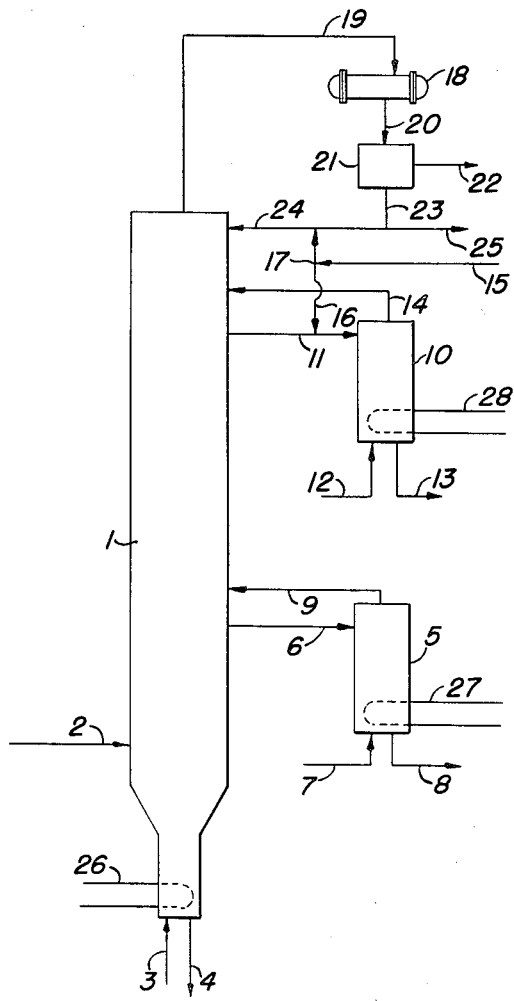
INVENTOR.
LEON LAZARE,
BY John V. Whittenburg
ATTORNEY.

United States Patent Office 2,752,296
Patented June 26, 1956

2,752,296

FRACTIONAL DISTILLATION OF DECOMPOSITION PRODUCTS OF DIARYL ALKANES

Leon Lazare, Westbury, N. Y., assignor to American Cyanamid Company, New York, N. Y., a corporation of Maine Application August 26, 1954, Serial No. 452,413

17 Claims. (Cl. 202—46)

This invention relates to separation of a mixture obtained by the partial catalytic decomposition of a paraffin having at least two carbon atoms and having aryl substituents attached to one of said carbon atoms. More particularly, this invention relates to the separation by fractional distillation of a mixture of a 1,1-diarylethane, a vinyl-substituted aryl compound and an alkyl-substituted aryl compound.

Mixtures of organic compounds obtained by the partial catalytic decomposition of a paraffin having at least two carbon atoms and having two aryl substituents attached to one of said carbon atoms contain such compounds as undecomposed paraffin, vinyl-substituted aryl compounds and alkyl-substituted aryl compounds. The separation of the mixture is carried out by a fractional distillation in the presence of steam used as a diluent. The steam not only acts as a diluent for the mixture during the fractional distillation thereof but also acts as a source of heat to volatilize the volatile organic mixture. Inasmuch as certain materials contained in the mixture are heat-sensitive, the presence of steam acts to reduce the partial pressure of the compounds, particularly the heat polymerizable components in the system, thereby lowering the boiling point of such components in the system. By the process of my invention, an effective separation of the components is realized. The undecomposed paraffin recovered may again be subjected to a partial catalytic decomposition by a simple recycling of said paraffin to a cracking zone. The vinyl-substituted aryl compounds find particular employment in the production of polymers which in turn are useful for molding, casting, laminating and other purposes. The alkyl-substituted aryl compounds obtained by the separation of the mixture are also useful in that they may be reacted by processes well known in the art for the formation of additional substituted paraffin compounds.

It is therefore an object of my invention to separate by fractional distillation the mixture obtained by the partial catalytic decomposition of a paraffin having at least two carbon atoms and having two aryl substituents attached to one of said carbon atoms. It is a further object of my invention to separate a mixture containing a 1,1-diarylethane, a vinyl-substituted aryl compound and an alkyl-substituted aryl compound. These and other objects of my invention will be discussed more fully hereinbelow.

Paraffins having at least two carbon atoms and having two aryl substituents attached to one of said carbon atoms, such as 1,1-diarylethane, may be prepared by the reaction of acetylene and a mono- or di-alkyl substituted benzene in the presence of a suitable catalyst. Such compounds when catalytically decomposed yield ring- or nuclear-substituted styrenes which are useful in the production of thermoplastic polymeric materials. Another method that may be employed in the production of substituted paraffins is such as the condensing of an aryl compound with a saturated aliphatic organic compound having a carbonyl group and at least two carbon atoms, e. g. aldehydes and ketones, in the presence of a suitable catalyst such as hydrogen fluoride. The substituted paraffin, such as 1,1-diarylethane, may also be prepared by reacting an aryl compound containing at least one hydrogen atom attached to the aromatic nucleus with vinyl acetate.

The partial catalytic decomposition of the paraffins having at least two carbon atoms and having two aryl substituents attached to one of said carbon atoms, such as 1,1-diarylethanes, is well known. The Dixon U. S. Patents Nos. 2,422,163–5 disclose various catalysts that may be employed for such decomposition. Upon partial decomposition of the substituted paraffins, a plurality of organic compounds is obtained. The mixture contains undecomposed substituted paraffin, vinyl-substituted aryl compounds and alkyl-substituted compounds. When a 1,1-diarylethane such as 1,1-ditolylethane is partially catalytically decomposed, the resulting mixture contains 1,1-ditolylethane, methylstyrene, a small percentage of ethyltoluene and toluene. In the event that a 1,1-dixylylethane is subjected to a partial catalytic decomposition, the resulting mixture contains undecomposed 1,1-dixylylethane, dimethylstyrene, a small amount of ethylxylene and xylene. By the process of my invention, a separation of the plurality of organic compounds contained in the mixtures is effected.

The partial catalytic decomposition of the substituted paraffins may be carried out at temperatures varying from about 350° C. up to about 600° C., or even higher in some cases, in the presence of a suitable decomposition catalyst. Inasmuch as temperatures above about 600° C. cause some pyrolysis loss, it is important to employ a short time of contact of the substituted paraffins with the catalyst when temperatures in the neighborhood of 600° C. are used. Any material which is volatile, which does not react with the diaryl-substituted paraffin and which does not react with the products formed by the decomposition of said paraffin may be used as a diluent during the partial catalytic decomposition. Among these, some examples are: water, the hydrocarbons such as benzene and toluene, the fixed gases such as nitrogen and carbon dioxide and the like. Water vapor is the preferred diluent inasmuch as it may be readily condensed and therefore separated from the products of the reaction, whereas the fixed gases or the hydrocarbons are somewhat more difficult to separate. The molar ratio of diluent to the diaryl-substituted aliphatic compound in the feed to the catalyst during decomposition is preferably between about 5:1 and 50:1, or more. As previously stated, steam or water vapor is the preferred diluent.

The mixture obtained by the partial catalytic decomposition of the diaryl-substituted paraffin will contain a large amount of steam when steam is used as the diluent during the cracking operation. The mixture will also be of a relatively high temperature in view of the temperature employed during the cracking operation. If desired, the mixture may be introduced directly into a fractional distillation column for separation but, inasmuch as certain critical operating conditions must be maintained during the separation of the material, it is desired that a portion of the cracker product be condenser prior to its introduction into the column in order to remove excess steam. Steam is preferably employed in the column to supply heat to the volatile organic compounds for the volatilization thereof but other methods may also be employed if desired, for example, a reboiler may be employed in the column. Also, fixed inert gases as well as fuel gas may be used as a source of heat. However, in view of the fact that condensation of the volatile material taken from the top of the column is more difficult in the presence of an inert gas, it is preferred that the heat supplied to the system be derived from steam. The temperature and the amount of steam employed during the distillation are such that no condensation of steam occurs in the column. This amount and temperature of the steam may be readily determined by those skilled in the art. It is necessary that the vapor pressure of the steam exceed the partial pressure of the steam in the vapor phase in order to avoid condensation in the column. Therefore, in the uppermost portion of the column there will be more vaporous alkyl-substituted aryl compound, e. g. toluene or xylene and the like, than steam. This weight ratio of alkyl-substituted aryl compound to steam may be adjusted by employing a lesser amount of steam during the distillation or an alternative method may be by refluxing a greater amount of the alkyl-substituted aryl compound.

The mixture containing undecomposed diaryl-substituted paraffin, vinyl-substituted aryl compounds, alkyl-substituted aryl compounds and steam obtained by the partial catalytic decomposition of the diaryl-substituted paraffin is introduced near the bottom of a fractional distillation column. In the event that a portion of the steam has been condensed from the cracker product prior to the introduction of the product into the column, it may be necessary to supply additional steam to the bottom of the column in order to insure complete volatilization of the organic compounds in the column. The volatile materials are then passed upwardly through the zones of the column and the undecomposed diaryl-substituted paraffin is withdrawn as a first overhead fraction as liquid from the distillation mixture. Obviously, a certain amount of tarry products will be present in the cracker product and the undecomposed diaryl-substituted paraffin is removed from a lower zone of the column, above which the tarry products have not passed. The tarry products are removed from the bottom of the column. The column employed for the fractional distillation of the mixture contains a plurality of plates, as is well known, and the column may be divided generally into four zones. In the first zone the tarry product from which the more volatile undecomposed diaryl-substituted paraffin has been stripped is withdrawn as bottom product. This first zone may be dispensed with if the amount of undecomposed diaryl-substituted paraffin in the tarry product entering this zone is negligible and the unstripped tarry product may then be withdrawn directly from the bottom of the column now deprived of this tarry product stripping zone. Furthermore, if the nature of the unstripped tarry product stream is excessively large, this zone may be physically separate from the remainder of the column. The unstripped tarry product issuing from the column is then introduced into the top of the physically separate zone and the vaporous volatile materials are returned together with the vaporous stripping medium to the bottom of the main column. In the second zone the undecomposed diaryl-substituted paraffin as liquid is withdrawn as a first overhead fraction. No tarry products pass this zone. The third zone of the column is employed to remove the vinyl-substituted aryl compound as liquid as a second overhead fraction. No undecomposed diaryl-substituted paraffin passes this zone. In the event that the cracker product contains some saturated vinyl-substituted aryl compounds, it is withdrawn as a liquid with the said vinyl-substituted compound. The fourth zone of the column is the uppermost portion of the column and all of the steam present, together with the alkyl-substituted aryl compound, is removed from the top of the column. It is in the uppermost zone that the ratio of the said alkyl-substituted aryl compound and the steam must be critically controlled in order to prevent any condensation of the steam in the column. The vapors removed from the top of the column are condensed in a conventional condenser, the water separated therefrom and a portion of the alkyl-substituted aryl compound then reintroduced into the top of the column as reflux.

The temperature at the top of the first zone of the column is preferably in the order of from about 200° C. to about 210° C. The undecomposed diaryl-substituted paraffin as liquid withdrawn from the first zone of the column is then treated in a side stripping column, preferably with steam, in order to remove any compounds having a boiling point lower than the said paraffin. The volatile materials removed from the paraffin are then reintroduced into the column at the point or slightly above the point of original takeoff and the undecomposed diaryl-substituted paraffin is withdrawn from the bottom of the side stripping column. The product recovered from the side stripping column is substantially pure and the temperature maintained in the side stripper is preferably in the order of from about 185° C. to about 200° C.

After the undecomposed diaryl-substituted paraffin has been removed from the mixture, distillation is continued in the column and the vinyl-substituted aryl compound as liquid is next removed as an overhead fraction in an intermediate zone of the column. The liquid removed is treated in a side stripping column, preferably with steam, to remove any volatile material having a boiling point lower than the said vinyl-substituted compound which is then reintroduced into the column at the point or slightly above the point of original takeoff. Inasmuch as heat polymerization of the vinyl-substituted compound may occur in the stripping column, it is often desirable to introduce a polymerization inhibitor into the stripping column. Inhibitors of polymerization, as are well known, are such as sulfur, hydroquinone, tertiary-butyl catechol, ditertiary-butyl hydroquinone, trinitrobenzene and the like. Sulfur is the preferred polymerization inhibitor. The temperature maintained in the side stripping column should be less than 115° C., preferably from about 100° C. to about 115° C., in order to avoid any heat polymerization of the vinyl-substituted compound in the column.

The remaining alkyl-substituted aryl compound and all of the steam are then removed from the uppermost zone of the column. The temperature in the upper portion of the column is preferably in the order of about 85° C. No vinyl-substituted aryl compound is allowed to pass out of the uppermost zone of the column. Therefore, the only components passing out of the upper portion of the column will be steam and the alkyl-substituted aryl compound.

The vinyl-substituted aryl compound recovered from the mixture may be treated by a subsequent distillation, as is well known in the art, to recover the compound from any saturated vinyl-substituted aryl compound present, as well as to recover the pure compound from the polymerization inhibitor introduced therein during the side stripping operation.

The present invention is particularly suitable for the separation of a mixture containing 1,1-ditolylethane, methylstyrene and toluene obtained by the partial catalytic decomposition of 1,1-ditolylethane. It is useful in the separation of a mixture containing 1,1-dixylylethane, dimethylstyrene and xylene obtained by the partial catalytic decomposition of 1,1-dixylylethane. Mixtures obtained by the partial decomposition of other diaryl-substituted paraffins may also be carried out herein.

My invention will be further illustrated by the simplified flow plan of the accompanying drawing. In the drawing the fractional distillation column 1 is charged with the reaction product obtained, for example, by the partial catalytic decomposition of 1,1-ditolylethane. The cracker product containing 1,1-ditolylethane, methylstyrene, toluene, tarry residue, trace amounts of ethyl toluene and steam is introduced into the column through line 2. In the event that too much steam, which would cause condensation in the column, is present in the cracker product, excess steam may be condensed therefrom prior to the introduction of the material into the column. If desired, only a portion of the cracker product may be treated to condense the steam present. If additional steam is necessary in order to completely strip the volatile cracker product from tarry residue, such steam may be introduced into the bottom of the column 1 through line 3. Tarry residues may be removed from the column through line 4. In the fractional distillation column 1 the 1,1-ditolylethane as liquid is withdrawn through line 6 into the side stripping column 5. Takeoff line 6 is so located that only trace quantities of tarry products pass the zone from which the 1,1-ditolylethane as liquid is removed. Steam may be introduced into the side stream stripper 5 through line 7 in order to remove any material having a boiling point lower than the 1,1-ditolylethane. The 1,1-ditolylethane is withdrawn through line 8. The volatile materials and the steam in the side stripping column are then reintroduced into the column 1 through line 9 into the zone of the column of original withdrawal of the liquid 1,1-ditolylethane.

The distillation in the column 1 continues and the methylstyrene as liquid is withdrawn through line 11 into the side stripping column 10. The zone of withdrawal of the methylstyrene is so located in the column 1 that only trace quantities of 1,1-ditolylethane are present. Steam may be introduced into the side stripping column 10 through line 12 in order to remove any materials having a boiling point lower than that of the methylstyrene which is withdrawn through line 13. The vaporous material is then reintroduced into the main column 1 at the zone of original withdrawal through line 14. Inasmuch as the methylstyrene has a tendency to polymerize, an inhibitor such as sulfur may be introduced into the liquid methylstyrene line 11 through lines 15 and 16. Any inhibitor introduced into the side stream stripper 10 will be removed with the product through line 13. Also, any ethyl toluene present in the system will also be removed with the methylstyrene. By a subsequent separation, the methylstyrene may be recovered from the ethyl toluene and the inhibitor.

All of the vaporous organic material and all of the steam present are then withdrawn from the uppermost zone of the column 1 through line 19 to the condenser 18. The point of withdrawal of the vaporous toluene and the steam is such that only trace quantities of methylstyrene are present. After the vaporous toluene and steam have been condensed in condenser 18, the liquid is introduced into the decanter 21 through line 20. The water is separated from the toluene and withdrawn through line 22 and the toluene is withdrawn from the decanter through line 23. A certain portion of the liquid toluene is then reintroduced into the uppermost zone of the column 1 through line 24. As previously indicated, the amount of toluene reintroduced into the main fractionating column as reflux is such that the ratio of toluene to steam in the upper portion of the column allows no condensation of steam in the column. The liquid toluene not refluxed to the main fractionating column is withdrawn through line 25 to storage. If desired, a small amount of the sulfur polymerization inhibitor may be introduced into reflux line 24 through line 17.

Conventional valves, temperature controls, flow regulators and the like may be employed throughout the equipment for critical control of the separation carried out. Indirectly heated reboiler systems 26, 27 and 28 may be employed in the system if desired. This will permit the use of a higher reflux ratio in the column. The distillation may be carried out under any desired pressure as, for example, superatmospheric, atmospheric or subatmospheric.

I claim:

1. A process for the production of a substantially pure compound selected from the group consisting of mono- and di-alkyl nuclear-substituted styrene which comprises subjecting to distillation in a fractional distillation column having a plurality of zones in the presence of steam as a diluent a mixture obtained by the partial catalytic decomposition of a 1,1-diarylethane, said mixture containing undecomposed 1,1-diarylethane, the aforementioned styrene and a compound selected from the group consisting of the mono- and di-alkyl substituted benzene from which the 1,1-diarylethane is prepared, removing as a first overhead fraction from said distillation mixture the 1,1-diarylethane as liquid from a lower zone, then removing as a second overhead fraction from said mixture the aforementioned styrene as liquid from an intermediate zone, introducing a polymerization inhibitor for said styrene, and lastly removing all of the steam together with the aforementioned substituted benzene from an upper zone and returning a portion of said substituted benzene to said upper zone as reflux in sufficient amounts to avoid condensation of steam in the column.

2. A process for separating a mixture of a plurality of aromatic compounds obtained by the partial catalytic decomposition of a paraffin having at least two carbon atoms and having two aryl substituents attached to one of said carbon atoms in a fractional distillation column having a plurality of zones, said mixture containing undecomposed paraffin, vinyl-substituted aryl compounds and alkyl-substituted aryl compounds, which comprises vaporizing and subjecting said mixture in said column to distillation in the presence of steam in sufficient amounts to act as diluent, passing said vapors upwardly through the zones of said column, withdrawing the undecomposed paraffin as liquid from a lower zone, continuing the distillation and withdrawing the vinyl-substituted aryl compound as liquid from an intermediate zone of said column, withdrawing from the uppermost of said zones of the column all of the steam present together with the vaporous alkyl-substituted aryl compound and returning a portion of said alkyl-substituted aryl compounds to the uppermost of said zones as reflux in sufficient amounts to avoid condensation of steam in the column.

3. A process for treating a volatile organic aromatic material containing a mixture of 1,1-diarylethane, a vinyl-substituted aryl compound and an alkyl-substituted aryl compound having different boiling points in a fractional distillation column having a plurality of zones which comprises passing said material with sufficient steam to act as diluent and to volatilize said material into a fractional distillation column having a plurality of zones, passing the volatilized material upwardly through the zones of said column, withdrawing from a lower zone the 1,1-diarylethane as liquid, treating said liquid to volatilize material having a lower boiling point, recovering the 1,1-diarylethane and returning said volatile material into the distillation column at the point of original withdrawal, continuing the distillation in said column, withdrawing at an intermediate zone the vinyl-substituted aryl compound as liquid, treating said liquid to volatilize material having a lower boiling point, recovering the vinyl-substituted aryl compound and returning said volatile material into the distillation column at the point of original withdrawal, withdrawing from the uppermost of said zones of the column all of the steam present together with the vaporous alkyl-substituted aryl compound, condensing the materials withdrawn from the uppermost of said zones, separating the alkyl-substituted aryl compound as liquid from said condensate and returning a portion of said alkyl-substituted aryl compound to the uppermost of said zones as reflux in sufficient amounts to avoid condensation of steam in the column.

4. A process for treating a volatile organic aromatic material containing a mixture of a 1,1-diarylethane, a vinyl-substituted aryl compound and an alkyl-substituted aryl compound having different boiling points in a fractional distillation column having a plurality of zones which comprises passing said material with sufficient steam to act as diluent and to volatilize said material into a fractional distillation column having a plurality of zones, passing the volatilized material upwardly through the zones of said column, withdrawing from a lower zone the 1,1-diarylethane as liquid, treating said liquid to volatilize material having a lower boiling point, recovering the 1,1-diarylethane and returning said volatile material into the distillation column at the point of original withdrawal, continuing the distillation in said column, withdrawing at an intermediate zone the vinyl-substituted aryl compound as liquid, introducing a polymerization inhibitor into the liquid, treating said liquid to volatilize material having a lower boiling point, recovering the vinyl-substituted aryl compound containing the polymerization inhibitor and returning said volatile material into the distillation column at the point of original withdrawal, withdrawing from the uppermost of said zones of the column all of the steam present together with the vaporous alkyl-substituted aryl compound, condensing the materials withdrawn from the uppermost of said zones, separating the alkyl-substituted aryl compound as liquid from said condensate and returning a portion of said alkyl-substituted aryl compound to the uppermost of said zones as reflux in sufficient amounts to avoid condensation of steam in the column.

5. A process for the production of substantially pure methylstyrene which comprises subjecting to distillation in a fractional distillation column having a plurality of zones in the presence of steam as a diluent a mixture obtained by the partial catalytic decomposition of a 1,1-ditolylethane, said mixture containing undecomposed 1,1-ditolylethane, the aforementioned styrene and toluene, removing as a first overhead fraction from said distillation mixture the 1,1-ditolylethane as liquid from a lower zone, then removing as a second overhead fraction from said mixture the aforementioned styrene as liquid from an intermediate zone, introducing a polymerization inhibitor for said styrene, and lastly removing all of the steam together with the aforementioned toluene from an upper zone and returning a portion of said toluene to said upper zone as reflux in sufficient amounts to avoid condensation of steam in the column.

6. A process for the production of substantially pure dimethylstyrene which comprises subjecting to distillation in a fractional distillation column having a plurality of zones in the presence of steam as a diluent a mixture obtained by the partial catalytic decomposition of a 1,1-dixylylethane, said mixture containing undecomposed 1,1-dixylylethane, the aforementioned styrene and xylene, removing as a first overhead fraction from said distillation mixture the 1,1-dixylylethane as liquid from a lower zone, then removing as a second overhead fraction from said mixture the aforementioned styrene as liquid from an intermediate zone, introducing a polymerization inhibitor for said styrene, and lastly removing all of the steam together with the aforementioned xylene from an upper zone and returning a portion of said xylene to said upper zone as reflux in sufficient amounts to avoid condensation of steam in the column.

7. A process for separating a mixture of a plurality of aromatic compounds obtained by the partial catalytic decomposition of 1,1-ditolylethane in a fractional distillation column having a plurality of zones, said mixture containing undecomposed 1,1-ditolylethane, methylstyrene and toluene, which comprises vaporizing and subjecting said mixture in said column to distillation in the presence of steam in sufficient amounts to act as diluent, passing said vapors upwardly through the zones of said column, withdrawing the undecomposed 1,1-ditolylethane as liquid from a lower zone, continuing the distillation and withdrawing the methylstyrene as liquid from an intermediate zone of said column, withdrawing from the uppermost of said zones of the column all of the steam present together with the vaporous toluene and returning a portion of said toluene to the uppermost of said zones as reflux in sufficient amounts to avoid condensation of steam in the column.

8. A process for separating a mixture of a plurality of aromatic compounds obtained by the partial catalytic decomposition of 1,1-dixylylethane in a fractional distillation column having a plurality of zones, said mixture containing undecomposed 1,1-dixylylethane, dimethylstyrene and xylene, which comprises vaporizing and subjecting said mixture in said column to distillation in the presence of steam in sufficient amounts to act as diluent, passing said vapors upwardly through the zones of said column, withdrawing the undecomposed 1,1-dixylylethane as liquid from a lower zone, continuing the distillation and withdrawing the dimethylstyrene as liquid from an intermediate zone of said column, withdrawing from the uppermost of said zones of the column all of the steam present together with the vaporous xylene and returning a portion of said xylene to the uppermost of said zones as reflux in sufficient amounts to avoid condensation of steam in the column.

9. A process for treating a volatile organic aromatic material containing a mixture of 1,1-ditolylethane, methylstyrene and toluene having different boiling points in a fractional distillation column having a plurality of zones which comprises passing said material with sufficient steam to act as diluent and to volatilize said material into a fractional distillation column having a plurality of zones, passing the volatilized material upwardly through the zones of said column, withdrawing from a lower zone the 1,1-ditolylethane as liquid, treating said liquid to volatize material having a lower boiling point, recovering the 1,1-ditolylethane and returning said volatile material into the distillation column at the point of original withdrawal, continuing the distillation in said column, withdrawing at an intermediate zone the methylstyrene as liquid, treating said liquid to volatilize material having a lower boiling point, recovering the methylstyrene and returning said volatile material into the distillation column at the point of original withdrawal, withdrawing from the uppermost of said zones of the column all of the steam present together with the vaporous toluene, condensing the materials withdrawn from the uppermost of said zones, separating the toluene as liquid from said condensate and returning a portion of said toluene to the uppermost of said zones as reflux in sufficient amounts to avoid condensation of steam in the column.

10. A process for treating a volatile organic aromatic material containing a mixture of 1,1-dixylylethane, dimethylstyrene and xylene having different boiling points in a fractional distillation column having a plurality of zones which comprises passing said material with sufficient steam to act as diluent and to volatilize said material into a fractional distillation column having a plurality of zones, passing the volatilized material upwardly through the zones of said column, withdrawing from a lower zone the 1,1-dixylylethane as liquid, treating said liquid to volatilize material having a lower boiling point, recovering the 1,1-dixylylethane and returning said volatile material into the distillation column at the point of original withdrawal, continuing the distillation in said column, withdrawing at an intermediate zone the dimethylstyrene as liquid, treating said liquid to volatilize material having a lower boiling point, recovering the dimethylstyrene and returning said volatile material into the distillation column at the point of original withdrawal, withdrawing from the uppermost of said zones of the column all of the steam present together with the vaporous xylene, condensing the materials withdrawn from the uppermost of said zones, separating the xylene as liquid from said condensate and returning a portion of said xylene to the uppermost of said zones as reflux in sufficient amounts to avoid condensation of steam in the column.

11. A process for treating a volatile organic aromatic material containing a mixture of 1,1-ditolylethane, methylstyrene and toluene having different boiling points in a fractional distillation column having a plurality of zones which comprises passing said material with sufficient steam to act as diluent and to volatilize said material into a fractional distillation column having a plurality of zones, passing the volatilized material upwardly through the zones of said column, withdrawing from a lower zone the 1,1-ditolylethane as liquid, treating said liquid to volatilize material having a lower boiling point, recovering the 1,1-ditolylethane and returning said volatile material into the distillation column at the point of original withdrawal, continuing the distillation in said column, withdrawing at an intermediate zone the methylstyrene as liquid, introducing a polymerization inhibitor into the liquid, treating said liquid to volatilize material having a lower boiling point, recovering the methylstyrene containing the polymerization inhibitor and returning said volatile material into the distillation column at the point of original withdrawal, withdrawing from the uppermost of said zones of the column all of the steam present together with the vaporous toluene, condensing the materials withdrawn from the uppermost of said zones, separating the toluene as liquid from said condensate and returning a portion of said toluene to the uppermost of said zones as reflux in sufficient amounts to avoid condensation of steam in the column.

12. A process for treating a volatile organic aromatic material containing a mixture of 1,1-dixylylethane, dimethylstyrene and xylene having different boiling points in a fractional distillation column having a plurality of zones which comprises passing said material with sufficient steam to act as diluent and to volatilize said material into a fractional distillation column having a plurality of zones, passing the volatilized material upwardly through the zones of said column, withdrawing from a lower zone the 1,1-dixylylethane as liquid, treating said liquid to volatilize material having a lower boiling point, recovering the 1,1-dixylylethane and returning said volatile material into the distillation column at the point of original withdrawal, continuing the distillation in said column, withdrawing at an intermediate zone the dimethylstyrene as liquid, introducing a polymerization inhibitor into the liquid, treating said liquid to volatilize material having a lower boiling point, recovering the dimethylstyrene containing the polymerization inhibitor and returning said volatile material into the distillation column at the point of original withdrawal, withdrawing from the uppermost of said zones of the column all of the steam present together with the vaporous xylene, condensing the materials withdrawn from the uppermost of said zones, separating the xylene as liquid from said condensate and returning a portion of said xylene to the uppermost of said zones as reflux in sufficient amounts to avoid condensation of steam in the column.

13. A process for treating a volatile organic aromatic material containing a mixture of 1,1-dixylylethane, dimethylstyrene and xylene having different boiling points in a fractional distillation column having a plurality of zones which comprises passing said material with sufficient steam to act as diluent and to volatilize said material into a fractional distillation column having a plurality of zones, passing the volatilized material upwardly through the zones of said column, withdrawing from a lower zone the 1,1-dixylylethane as liquid, treating said liquid to volatilize material having a lower boiling point, recovering the 1,1-dixylylethane and returning said volatile material into the distillation column at the point of original withdrawal, continuing the distillation in said column, withdrawing at an intermediate zone the dimethylstyrene as liquid, introducing sulfur as a polymerization inhibitor into the liquid, treating said liquid to volatilize material having a lower boiling point, recovering the dimethylstyrene containing sulfur as a polymerization inhibitor and returning said volatile material into the distillation column at the point of original withdrawal, withdrawing from the uppermost of said zones of the column all of the steam present together with the vaporous xylene, condensing the materials withdrawn from the uppermost of said zones, separating the xylene as liquid from said condensate and returning a portion of said xylene to the uppermost of said zones as reflux in sufficient amounts to avoid condensation of steam in the column.

14. A process for separating a mixture of a plurality of aromatic compounds obtained by the partial catalytic decomposition of a 1,1-diarylethane in a fractional distillation column having a plurality of zones, said mixture containing undecomposed 1,1-diarylethane, vinyl-substituted aryl compounds and alkyl-substituted aryl compounds, which comprises vaporizing and subjecting said mixture in said column to distillation in the presence of steam in sufficient amounts to act as diluent, passing said vapors upwardly through the zones of said column, withdrawing the undecomposed 1,1-diarylethane as liquid from a lower zone, continuing the distillation and withdrawing the vinyl-substituted aryl compound as liquid from an intermediate zone of said column, withdrawing from the uppermost of said zones of the column all of the steam present together with the vaporous alkyl-substituted aryl compound and returning a portion of said alkyl-substituted aryl compounds to the uppermost of said zones as reflux in sufficient amounts to avoid condensation of steam in the column.

15. A process for the production of a substantially pure compound selected from the group consisting of mono- and di-alkyl nuclear-substituted styrene which comprises subjecting to distillation in a fractional distillation column having a plurality of zones in the presence of steam as a diluent a mixture obtained by the partial catalytic decomposition of a 1,1-diarylethane, said mixture containing tarry residue, undecomposed 1,1-diarylethane, the aforementioned styrene and a compound selected from the group consisting of the mono- and di-alkyl substituted benzene from which the 1,1-diarylethane is prepared, removing as a first overhead fraction from said distillation mixture the 1,1-diarylethane as liquid from a lower zone, then removing as a second overhead fraction from said mixture the aforementioned styrene as liquid from an intermediate zone, introducing a polymerization inhibitor for said styrene, next removing from said mixture the tarry residue as bottom product, and lastly removing all of the steam together with the aforementioned substituted benzene from an upper zone and returning a portion of said substituted benzene to said upper zone as reflux in sufficient amounts to avoid condensation of steam in the column.

16. A process for separating a mixture of a plurality of aromatic compounds obtained by the partial catalytic decomposition of a paraffin having at least two carbon atoms and having two aryl substituents attached to one of said carbon atoms in a fractional distillation column having a plurality of zones, said mixture containing tarry residue, undecomposed paraffin, vinyl-substituted aryl compounds and alkyl-substituted aryl compounds, which comprises vaporizing and subjecting said mixture in said column to distillation in the presence of steam in sufficient amounts to act as diluent, passing said vapors upwardly through the zones of said column, withdrawing the tarry residue from the bottom thereof, the undecomposed paraffin as liquid from the next upper zone, continuing the distillation and withdrawing the vinyl-substituted aryl compound as liquid from an intermediate zone of said column, withdrawing from the uppermost of said zones of the column all of the steam present together with the vaporous alkyl-substituted aryl compound and returning a portion of said alkyl-substituted aryl compounds to the uppermost of said zones as reflux in sufficient amounts to avoid condensation of steam in the column.

17. A process for treating a volatile organic aromatic material containing a mixture of tarry residue, 1,1-diarylethane, a vinyl-substituted aryl compound and an alkyl-substituted aryl compound having different boiling points in a fractional distillation column having a plurality of zones which comprises passing said material with sufficient steam to act as diluent and to volatilize said material into a fractional distillation column having a plurality of zones, then allowing the non-volatilized tarry residue containing some dissolved 1,1-diarylethane to enter a bottom zone wherein it is heated to volatilize the 1,1-diarylethane, then passing the total volatilized material upwardly through the zones of said column, withdrawing from the next upper zone the 1,1-diarylethane as liquid, treating said liquid to volatilize material having a lower boiling point, recovering the 1,1-diarylethane and returning said volatile material into the distillation column at substantially the point of original withdrawal, continuing the distillation in said column, withdrawing at an intermediate zone the vinyl-substituted aryl compound as liquid, treating said liquid to volatilize material having a lower boiling point, recovering the vinyl-substituted aryl compound and returning said volatile material into the distillation column at substantially the point of original withdrawal, withdrawing from the uppermost of said zones of the column all of the steam present together with the vaporous alkyl-substituted aryl compound, condensing the materials withdrawn from the uppermost of said zones, separating the alkyl-substituted aryl compound as liquid from said condensate and returning a portion of said alkyl-substituted aryl compound to the uppermost of said zones as reflux in sufficient amounts to avoid condensation of steam in the column.

References Cited in the file of this patent

UNITED STATES PATENTS

| | | |
|---|---|---|
| 2,188,772 | Dreisbach et al. | Jan. 30, 1940 |
| 2,240,764 | Dreisbach et al. | May 6, 1941 |
| 2,556,030 | Coulter et al. | June 5, 1951 |

OTHER REFERENCES

"Technique of Organic Chemistry, vol. IV, Distillation" (Interscience 1951), pp. 374–378, 357–359.

"Elements of Fractional Distillation," by Robinson and Gilliland, 4th ed. (McGraw Hill, 1950).